ELECTRON-TUBE

Filed April 29, 1952 4 Sheets-Sheet 1

INVENTORS
OLAF STERNBECK
WOLFRAM ERHARD MAX UHLMANN
BY Leech & Radue
ATTORNEYS

ELECTRON-TUBE

Filed April 29, 1952

INVENTORS
OLAF STERNBECK
WOLFRAM ERHARD MAX UHLMANN

BY Leech & Radue

ATTORNEYS

INVENTORS
OLAF STERNBECK
WOLFRAM ERHARD MAX UHLMANN

BY Leech & Radue
ATTORNEYS

ELECTRON-TUBE

Filed April 29, 1952 4 Sheets-Sheet 4

INVENTORS
OLAF STERNBECK
WOLFRAM ERHARD MAX UHLMANN
BY Leech & Radue
ATTORNEYS

United States Patent Office 2,800,599

Patented July 23, 1957

2,800,599

ELECTRON-TUBE

Olaf Sternbeck, Alvsjo, and Wolfram Erhard Max Uhlmann, Hagersten, Sweden, assignors to Telefonaktiebolaget L M Ericsson, Stockholm, Sweden, a company of Sweden Application April 29, 1952, Serial No. 284,893

Claims priority, application Sweden January 16, 1952

5 Claims. (Cl. 313—105)

The present invention relates to an electron tube of the kind, in which information in the form of electrical pulses can be stored and, if wanted, be retained within the tube for an arbitrary time. The stored information may be "read" during the storage time as often as wanted.

The hitherto known so called register or storage tubes, i. e. electron tubes intended for the storage of numbers in the form of electric pulses in a binary system, allow the writing-in and reading-out of registered or stored information as electric pulses, which are taken out of the tube as a pulse-train. These pulses can therefore only be read out one at a time. Previously known electron-tubes of this kind work usually with one or several electron beams, which sweep over a number of storage elements or storage electrodes in a certain sequence.

It is in certain cases useful to have the possibility of writing in and reading out registered information as a multitude of simultaneous pulses over a number of input and output terminals. Such a possibility is offered by the known magnetic drum with a number of recording- and reading-heads, by means of which information can be registered on the drum as pulsed magnetization of a surface element and read out by means of playing-back head as electric pulses.

Electron tubes of the described type are necessary for electronic telephone systems in which a certain number, e. g. the telephone number of the A- and B-subscriber shall be expressed in a binary code, appearing as simultaneous pulses on a number of leads. In such a system the code is repeated usually every 125th microsecond during the time a connection lasts, where "simultaneous" connections are represented by several codes, shifted in time between themselves.

The present invention solves the same problem, for which up to now the aforementioned magnetic storage device has been used, by means of an electronic appliance, which has, compared with the magnetic drum, the advantage of a simpler construction and greater speed. In such an appliance the stored information furthermore remains accessible at any arbitrary moment.

The electron tube according to the invention for storing of information, the information being fed to the electron tube as electric signals, is mainly characterized by containing at least a cathode, an acceleration grid, a collector electrode and a number of secondary-electrons emitting storage electrodes or elements, the leads of the latter individually brought out through the glass envelope, and said storage elements being arranged in such a manner that they are mainly equally subjected to the bombardment by the primary electrons issued by the cathode. Furthermore each storage electrode is arranged in such a manner, that it has, at least at one potential distribution within the tube, independent of the potential of the other storage elements, a certain secondary emission, suitably surpassing the primary current flowing to the electrode in question.

In the tube according to the invention the aforementioned storage elements may consist of a pure, untreated metal. The burning in of the tube during the process of manufacture of the tube is then conducted in such a manner that a sufficient amount of electron emitting material is evaporated from the cathode on to each storage element in order to make possible the necessary secondary emission. The aforementioned electron emitting material is during the operation of the tube continuously renewed, as it is continuously evaporated from the cathode coating and deposited on the surface of the storage electrodes.

Further features, characteristic of the invention, will be apparent from the following description in connection with the attached drawings, in which various examples for the construction of the tube according to the invention and several register circuits utilizing this tube are shown.

Fig. 1 of the drawings shows the electrode system of an electron tube according to the invention seen from above.

Figs. 2*a* and 2*b* show another electron tube according to the invention seen respectively in a section from the side and from above.

The register tube according to the invention is a high vacuum tube which can store information for an arbitrary time. The tube shown in Figures 1, 2*a*, 2*b* and 4 contains 20 secondary electron emitting electrodes as storage elements. The leads to these electrodes are individually brought out through the glass envelope of the tube. With the tube as shown, the reading of information stored in the register elements is accomplished without disturbing or destroying this information by the reading process. In other words, the registered information is available for a renewed reading over and over again until it is, at any arbitrary moment, wiped out, whereafter the tube is again accessible for receiving new information for storage. An important characteristic of the invention is that any arbitrary number of storage elements may simultaneously be utilized as well for registering as for reading of stored information. This quality makes the tube useful for a multitude of applications, e. g. in the telephone technique and for electronic computing devices.

Figure 2A:
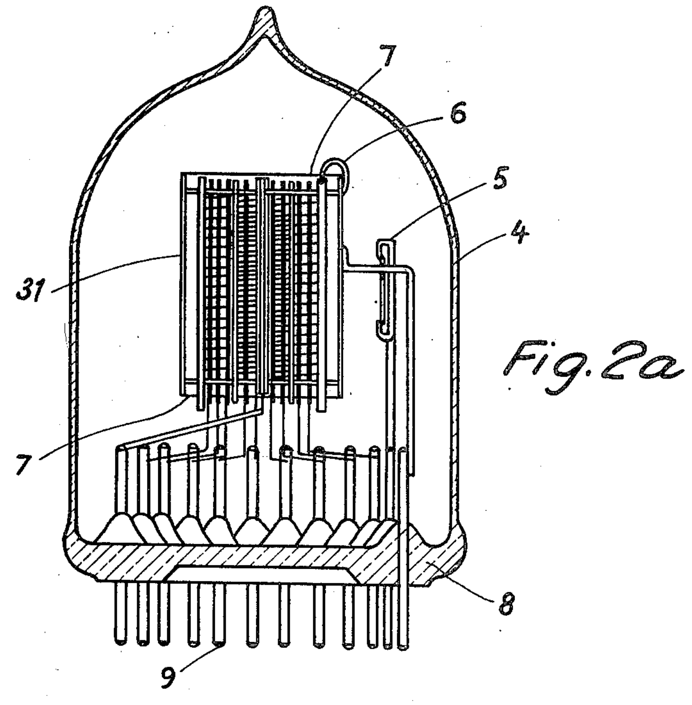
Figures 1, 2B:
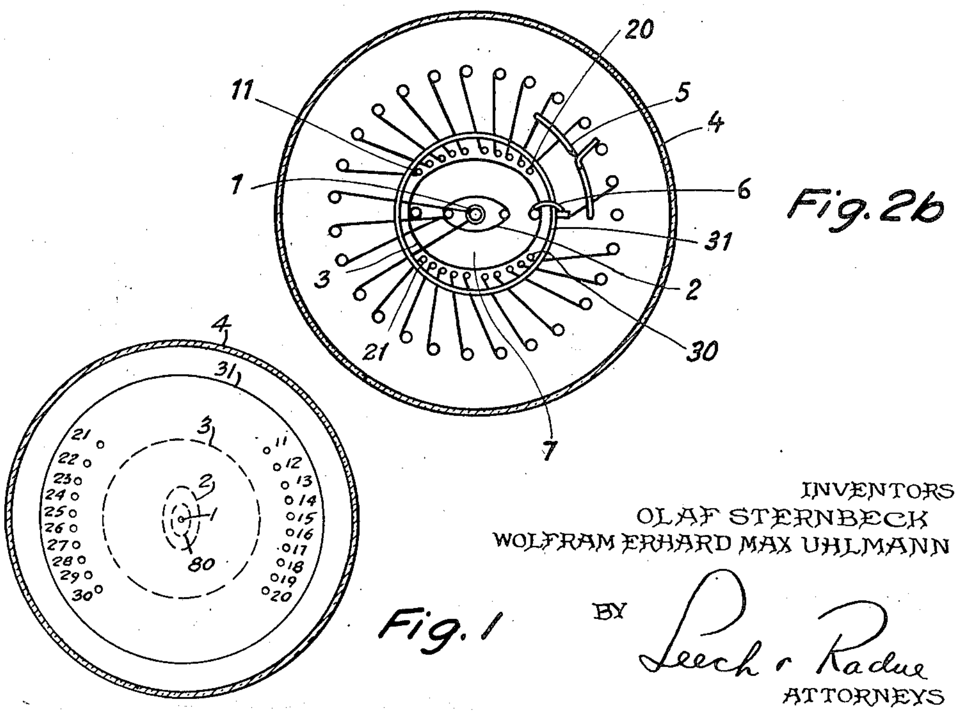

The mechanical construction of the register tube is apparent from Fig. 1, in which the electrode system is shown much simplified and in a plane perpendicular to the axis of the cathode. The tube contains within the evacuated envelope 4 an indirectly heated oxide cathode 1 surrounded at a relatively small distance by a grid 2, which is used for extracting electrons from the cathode 1. The grid-voltage is somewhat positive with respect to the cathode. Concentrically with the cathode 1 and the grid 2 another grid 3 is arranged, connected within the tube with a cylindrical metal screen 31, consisting e. g. of nickel sheet. This screen is kept at a higher potential than grid 2, e. g. +150 volts, and serves together with the grid 3 as collector for the secondary electrons, emitted by the register-elements 11—20 and 21—30. The last mentioned elements consist e. g. of nickel wires, arranged between the collector grid 3 and the collector screen 31.

Figs. 2*a* and 2*b* show details of another form of the tube according to the invention. 1, 2 and 3 indicate, as before, cathode, first grid, and second grid (collector grid). Grid 3 is connected by the wire 6 with the screen 31. 5 indicates a getter. The different electrodes are in the usual way connected with pins 9, passing through the base 8 of the tube. Only the register elements 11, 20, 21 and 30 are in Fig. 2 indicated by numbers. The two grids 2 and 3 consist of wire spirals, but may as well be squirrel-cage grids, and the whole electrode system is fastened to an upper and a lower mica disc 7. The glass-envelope is indicated by 4. In the tube, described afore as an example, the grid 2 is somewhat positive with respect to the cathode. It is possible and sometimes desirable to arrange between this grid and the cathode another grid, indicated by 80 in Fig. 1, having a negative bias with respect to the cathode. Such a grid makes control of the tube possible without drawing noticeable current.

Figures 3, 4:
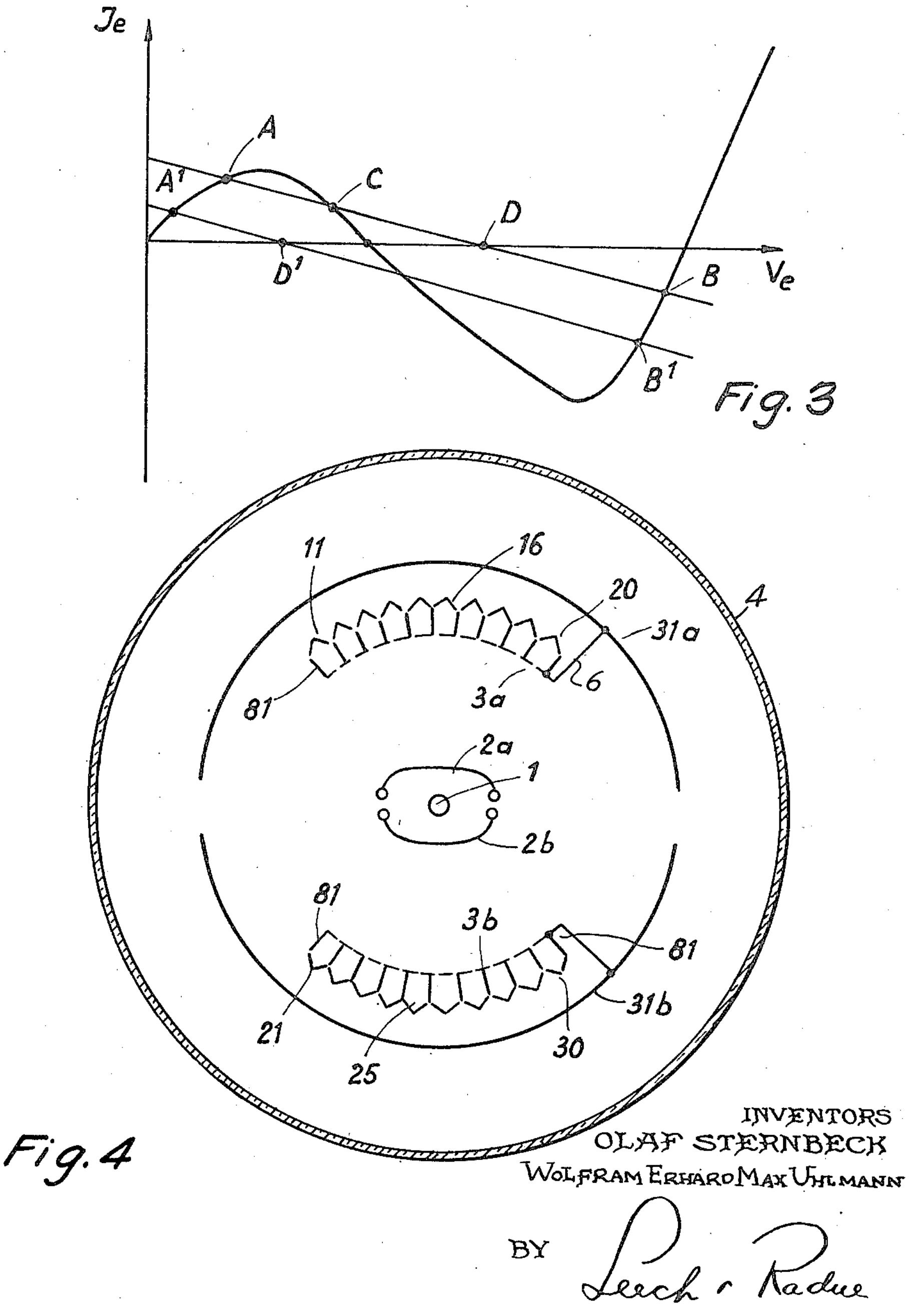
Fig. 3 shows a diagram of the current from a register or storage element as a function of the voltage of this electrode or element together with the resistance lines for one load-resistor, connected with the electrode or element.
Fig. 4 shows a modified construction of the electrode system of a tube according to the invention.

The application of the tube shown in Figures 1, 2*a* and 2*b* relies on the dynatron characteristics of the register elements 11—30. Fig. 3 shows the current $J_e$ from a storage element 11—30 as a function of the voltage $V_e$ of this element.

For "writing in" an information, e. g. a D. C. signal may be used, which is passed over a register to a certain register-element. The lines A—C—D—B and A′—D′—B′ are resistance lines for the aforementioned resistor for two values of the mentioned D. C. voltage.

If in the beginning no current flows within the tube, the register element under consideration will have a potential equal to the potential connected over the mentioned resistor to the element. This potential is assumed to be low and near cathode potential, e. g. the potential according to the point D′ in Fig. 3. If afterwards a cathode current is caused to flow through the tube and the potential connected from the outside over the resistor to the element is kept unchanged (point D′), the potential of the element will drop to the point A′, the first stable point of the characteristics. When now the potential, connected from the outside to the resistor, rises, e. g. to a value corresponding to point D, the potential of the element under consideration will only be insignificantly influenced, which will only rise to the point A of the characteristics. It is obvious that the potential of the element, despite the fact that the other end of the corresponding resistor is kept at a relatively high D. C. voltage (point D), will remain at a value near to the cathode potential, always supposing that the potential fed to it from the outside, or written in, is low at the moment the cathode current begins to flow.

If on the contrary, when no current is flowing within the tube, the potential connected from the outside over the resistor to the element is high, e. g. corresponding to the point D in Fig. 3, the potential of the element will be high as well (point D). If now the cathode-current is caused to flow, whilst the potential at the resistor is kept up (point D), the potential of the element will rise to the point B, the second stable point of the characteristics near the collector potential. If now the potential connected from the outside to the resistor is, e. g., lowered to the point D′, the potential of the register element will only be lowered insignificantly, i. e. to the point B′. In this case the potential of the element remains also obviously at the value, which it had, when the current within the tube started to flow.

The potential of a register element can therefore only have two values, i. e. a low one (point A—A′) near the cathode potential, or a high one (B—B′) near to the collector potential, independent of how the D. C. signal fed in from the outside varies. Which of these two values the potential of the element will assume depends on the value of the aforementioned D. C. signal at the moment the current in the tube begins to flow, i. e. the value of the potential "written in" to the element in question.

The reading out of the registered information, i. e. the determination which of the elements 11—30 inside the tube according to the invention has a high potential (point B or B′), or a low one (point A or A′), may be accomplished in the following manner.

The resistance between an element, which is locked to collector potential, and the collector electrode 3, 31 is very high, practically indefinitely large, as the capacitance between this element and the collector is small and no primary electrons can reach the register element and release secondary electrons, which could go to the collector and thus establish a current between these two electrodes.

On the other hand the resistance between an element, which is locked to the cathode potential (point B) and the collector is relatively small, as a current flows between these two electrodes as soon as the collector potential changes. When an A. C. voltage is connected to the collector 3, 31, almost no voltage will appear at an element on cathode potential (point A), whilst a strong A. C. signal will appear at an element locked to the collector potential (point B).

In the simple tube shown in Figures 1, 2*a* and 2*b* according to the invention, the potential of a storage element will influence the characteristics of another element nearby. This influence is however in the present tube of lesser importance. One can nevertheless reduce this influence by a more complicated construction, as e. g. shown in Fig. 4.

In Fig. 4 the different elements 11—20 and 21—30 are electrostatically screened by providing the collector grid 3*a*, 3*b* with screens 81 between the different register elements. In this way, a number of compartments is obtained, which are separated from each other by the screens 81. The last mentioned are, e. g., obtained by providing the collector grid with bent out flaps. The grid 3*a*, 3*b* is in contrast to the spiral grid 3 shown in Fig. 2, formed at the upper and lower edges by connected cylinder halves (indicated by straight lines in Fig. 4), provided with windows opposite to each storage element 11—30. The last mentioned are suitably longish and loaf-shaped or of an analogous shape and form the bottom of each compartment.

In the tube shown in Figs. 1, 2*a* and 2*b* all operations regarding the register elements contained in the tube are undertaken simultaneously. It is however desirable for some applications that, e. g. the writing-in can be done only for one group of elements at once, e. g. for ten elements out of the twenty contained in the tube according to Fig. 1. It is of course possible to divide the common electrodes in a suitable number, e. g. two, of parts and to use these different parts for influencing the different groups of elements. Such a form of the tube according to the invention is shown in Fig. 4, where the register elements are divided in two groups 11—20 and 21—30, respectively, to each of which is allotted a half of the collector 3*a* and 3*b*, and a half of the grid 2*a* and 2*b*, respectively.

A tube as described afore in connection with Figures 1, 2, and 4 may be used in a great number of practical applications. For showing this and explaining more clearly the qualities of the tube according to the invention, a number of circuits utilizing such a tube shall be described in connection with Figures 5–7 of the drawings.

Figure 5:
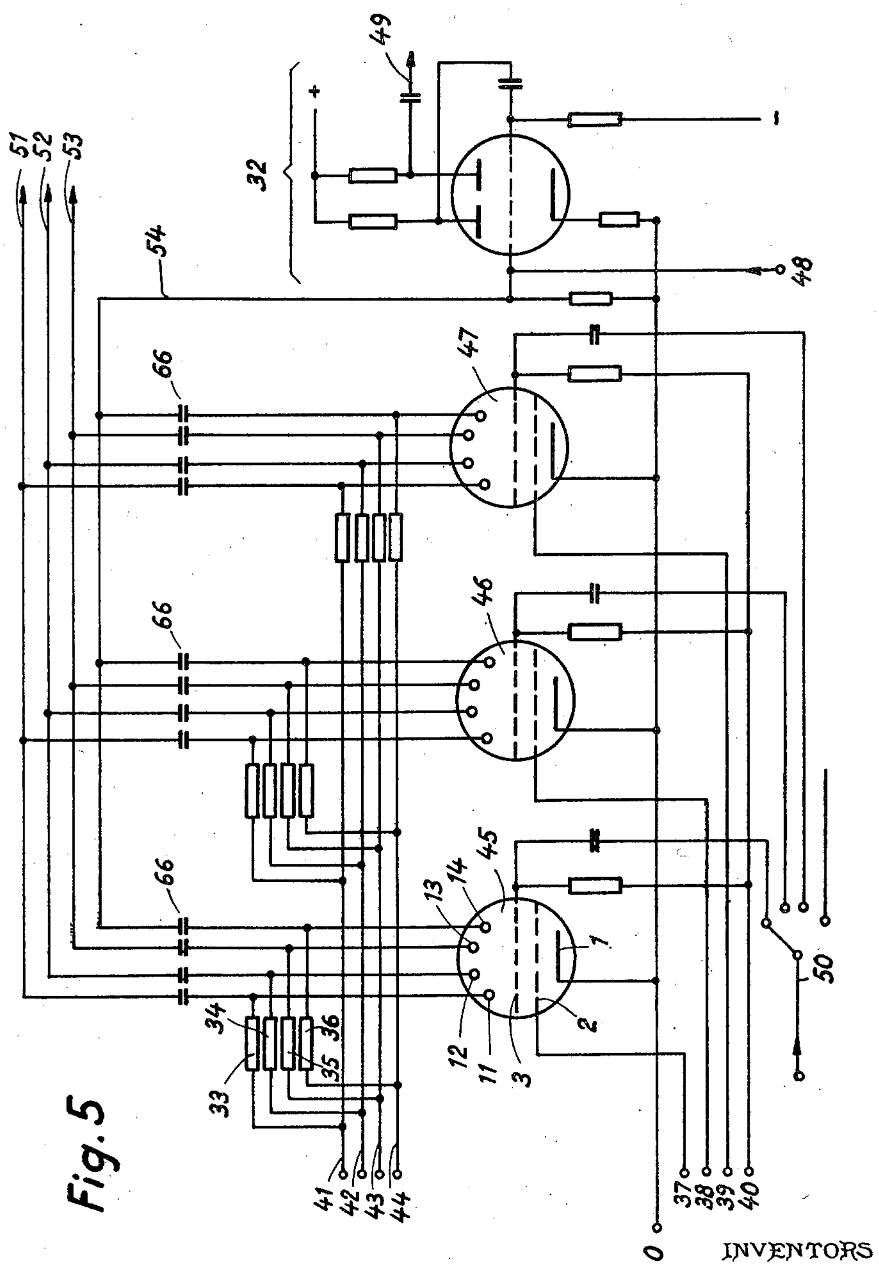
Figs. 5–7 show examples of various circuits utilizing the tube according to the invention for the registering or storing of electric pulses.

The circuit diagram for a tube according to the invention, shown in Fig. 5, comprises three register tubes 45, 46, and 47. Each tube contains a cathode 1, a first grid 2, a collector grid 3, and four register elements 11, 12, 13, and 14. The last mentioned are connected over individual leads and resistors 33, 34, 35, and 36 with the input terminals 41, 42, 43, and 44, to which the pulses, which shall be written-in to the tube, are fed. The mentioned input terminals are common for each of the three shown tubes 45, 46, and 47. The register elements are further on connected with individual, but for elements in the different tubes common output leads 51, 52, 53, and 54. The grid 2 in each tube is connected with an individual input terminal 37, 38, and 39, and the grids 3 are connected over resistors with a common input terminal 40. The collector grids are further on connected over condensors with individual contacts of a distributor 50. Finally the outgoing lead 54 is shown as being connected with a multivibrator 32, the output lead of which is designated by 49.

The writing-in of information is done in the circuit shown in Fig. 5, in the following manner. The potentials at the input terminals 41—44 are in preparation for the writing-in about zero and the grids 2 in the tubes 45—47 have positive bias over the terminals 37—39, e. g. +10 volts. Therefore, a current can flow in all the tubes 45—47 and the storage elements in these tubes have the potential zero. In other words, the elements are locked to this potential. Now, the wanted writing voltage is fed as a D. C. signal to the terminals 41—44. The tubes are arranged to accept storage in a binary code system, and the terminals 41—44 should therefore have one of two potential values. It is assumed in the present case, that these different values are a positive voltage, e. g. 100 volts, and cathode potential, i. e. 0 volt. It is further assumed that the wanted writing voltage 100 volts is fed to the terminals 41 and 44, whilst the terminals 42 and 43 receive the voltage 0 volt. With the connection of the named potentials to these terminals, nothing happens in the tubes, as current is flowing under the described conditions. It shall be further assumed, that it is wanted to register the information on the terminals 41—44, i. e. +, 0, 0, +, in the first tube 45. To this end the grid 2 thereof is for a moment connected with cathode potential (0 volt), thus interrupting the current in tube 45. Therefore, the electrodes 11—14 in this tube will assume the potentials, which are to be found at the corresponding terminals 41—44. In the case considered, the electrodes 11 and 14 will assume a high, positive potential, while the electrodes 12 and 13 will get the potential 0. Thereafter a positive potential (10 volts) is connected again to the grid 2 and again a current flows in the tube. The different electrodes will now mainly retain the potentials which they have assumed by way of the writing potentials at the terminals 41—44, i. e. the potential of the electrodes 11 and 14 remains high and the potential of the electrodes 12 and 13 remains low. The potential of the secondary emitting electrodes will be for the two first mentioned at the point B in Fig. 3 and this for the two last mentioned at point A in the same figure. The named electrodes remain, in other words, locked up and locked down, respectively, in potential in accordance with the potentials connected to the writing terminals. The electrodes 11—14 retain the potential +, 0, 0, +, as long as the grid 2 is positive (10 volts). In this way, the wanted information or figure combinations is stored on these elements of the valve 45. The writing voltage at the input terminals 41—44 may be removed, as soon as the positive bias is again applied to the grid 2. These terminals are in this way again available for writing of new information in any of the tubes 46 or 47, without herewith disturbing or destroying the information already registered in the tube 45. It is assumed that the information +, 0, 0, 0 is stored in the tube 46 and the information 0, +, +, + in the tube 47.

The writing time for registering information is in the circuit according to Fig. 5 determined by the resistors 33—36 and the condensers 66.

The information stored in the tubes 45—47 may be read as often as wanted over the leads 51—54. The information is obtained as a pulse, corresponding to the potential of the elements 11—14 in the tubes 45—47, on each of the leads 51—54, the presence of a pulse corresponding to a lock-up element, the absence of a pulse corrresponding to a lock-down element. The resistance between the collector electrode 3 and the locked-up elements (+), 11—14, is low and the resistance between the locked-down (0) elements and the collector electrode is high. In order to read the recorded information, negative pulses (e. g. —20 volts) are fed to the distributor electrode 3 via the distributor 50. The collector 50, which may consist of electron tubes or a so-called trochotron, connects the mentioned negative pulses in succession to the collector electrodes 3 of the different tubes 45—47. If in this way negative pulses are fed to the collector electrode 3, pulses of the same kind are obtained on the output leads 51—54. A lowering of the potential of the collector 3 will cause fewer electrons, emitted by the positive, secondary emitting electrodes 11—14, to be received by the less positive collector. As a greater number of these electrons, together with the still arriving negative primary electrons, go to the electrodes 11—14, the potential of these electrodes will be lowered as long as the pulse to the collector 3 lasts. This applies of course only to those elements 11—14, which have in the considered moment a positive potential. Thus, a current will flow over the corresponding output leads 51 and 54 from the electrodes 11 and 14 in the tube 45. The locked-up electrode 11 in the tube 46 will, when the distributor 50 at the following step connects a negative potential to the collector in this tube, issue to the lead 51 a negative pulse, whilst no pulse is obtained from the locked-down elements 12—14 in this tube 46 over the corresponding leads 52—54. In analogy, in a following reading-moment for the next tube 47, pulses will be issued from the locked-up elements 12—14, while no impulse will come from the locked-down electrode 11. If instead positive pulses are fed to the collector 3, positive pulses will be issued to the leads 51—54, which correspond to the locked-up electrodes 11—14, while no pulses will come from the locked-down electrodes.

The described reading procedure may be repeated an arbitrary number of times without destroying the information stored in the different tubes. As a result, a pulse train will be obtained on each of the output leads 51—54, which correspond to the one each element of the tubes registered information, and simultaneous pulses on the leads 51—54 represent obviously the information registered in one of these tubes in such a way that the presence of a pulse (+) or the absence (0) of a pulse at a certain moment represents the binary code, chosen for the representation of the information.

The writing process in the tube 47 will not influence the other tubes 45 and 46, as these have, during the writing in tube 47, a positive potential at the grid 2. During the writing in tube 47, nevertheless the reading of the earlier stored information in the tubes 45 and 46 may be undertaken without disturbance by the writing potential, which is for writing in the tube 47 applied to the terminals 41—44, under the condition that neither the writing potential at the last mentioned terminals is unnecessarily high nor the resistors 33—36 are too low.

Because there is a certain mutual influence between the different elements within one tube and because of the writing process taking place in another tube, all the pulses coming out over the leads 51—54 will not have the same amplitude. The inner resistance between the collector and an element will in a circuit according to Fig. 5 be c. 20–100 kiloohm for a locked-up element and over 20 megohm for a locked-down element. The inner resistance for a locked-up element will, i. a., depend on the code combination registered in the tube, the voltages and currents at/in the tube and the secondary emission properties of the element. The mentioned inequality of the different pulses may be evened out or normalized. For this purpose an amplifier is connected to each output lead 51—54 for shaping the pulse, in order that they have the same size and length. An example for such an amplifier is shown in Fig. 5, when a one stage multivibrator 32 is connected to the lead 54. The pulses, obtained from this multivibrator on the output lead 49 may be shortened by a terminating pulse (e. g. +5 volts) applied to the terminal 48. With other words, such an amplifier 32 makes the width of the outgoing pulses independent on the width of the distributed pulses, which fact may be important, if a trochotron is used as distributor 50.

The erasing of the information, stored in the tubes 45—49 may be accomplished by applying zero potential to the grid 2 over the terminals 37—39, thus interrupting the current in the tubes. As it is, from the point of view of tube life, not desirable to interrupt the current in the tubes for a longer time, a zero code (e. g. all the elements locked down) may be written-in, instead of interrupting the current permanently. This can be achieved by connecting all the terminals to zero potential and by grounding the grid 2 for a moment (potential 0), afterwards connecting this grid again to a positive potential (+10 volts). All the tubes, which undergo this procedure, will thus be returned to the initial state with the potential zero at all storage elements 11—14.

Besides the way described in connection with Fig. 5, of writing with a D. C. voltage at the terminals 41—44 for registering with constant current and repetitive reading with pulses at the collector electrode 3 there exist some other possibilities. Thus may the tubes 45—47 be normally without current, which is only made to flow in pulses. In this way, automatically output pulses are obtained from the locked-up elements (+). During the time when no current is flowing the condensors 66 in the output leads keep the potential of the elements up. In this case the current pulses at the elements become almost triangular. The writing may also be done by means of pulses over the condensors 66. The writing will happen in the tube in which during the time of the pulses current is flowing. For the reading exist as well many possibilities.

Figures 6, 7:
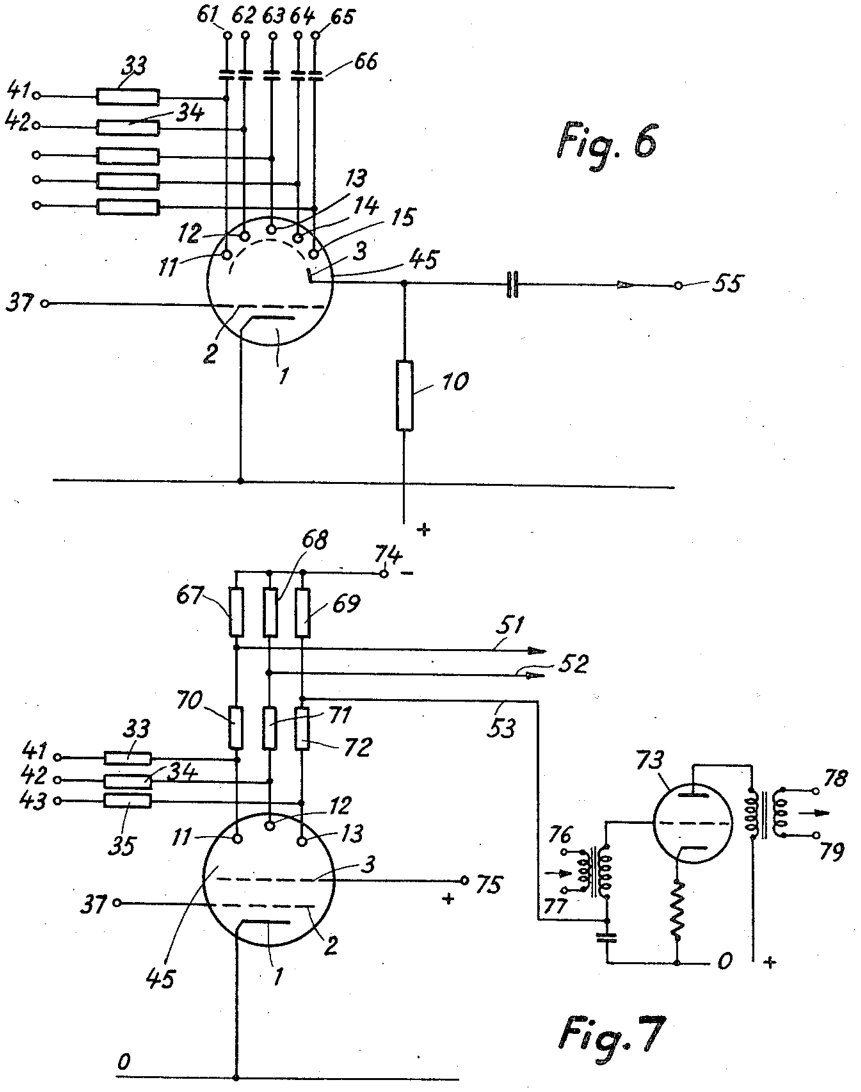

In Fig. 6, another circuit diagram with a tube according to the invention is shown, where the reading is accomplished by the application of different audio frequencies, one for each register element 11, 12 . . . in the tube. The circuit in Fig. 6 differs from that shown in Fig. 5 by taking out the pulses from the collector electrode 3. The writing is done in the same way as in Fig. 5 by feeding positive voltage or zero voltage to the input-terminals 41, 42 . . . , and the erasing of stored information is accomplished by changing the bias of the grid 2 as described afore. The different register elements 11, 12 etc. at the tube 45 are over condensors 66 connected with terminals designated by 61—65. To each of these terminals one individual audio frequency is permanently fed. For the reading of stored information as in the example in Fig. 5, the property of the tube according to the invention is utilized, that the resistance between collector 3 and locked-up (+) register elements 11, 12 etc. is low. The tube according to the invention will obviously work as a coupling device (in the example shown in Fig. 6) with five make-contacts with one common terminal (the collector 3). The closing of one contact in this device corresponds consequently to the locking up of a corresponding element 11, 12 etc., i. e. positive potential at this element, and the opening of a contact corresponds to the locking down, i. e. zero potential, of the element. For the register elements, which are locked up, in this way the current path is closed from the corresponding input terminal 61—65 over the element to the collector 3, thus the audio frequencies which are fed to the corresponding terminals will be passed over the collector to the output lead 55. Over the last mentioned leads is thus a mixture of audio frequencies obtained, which contains those, which correspond to lock-up elements, and which lacks those which correspond to locked-down elements. These audio frequencies can in different ways be utilized for coupling purposes. The circuit according to Fig. 6 can obviously be applied to a telephone system with a register for audio frequency signalization.

One can in such a register also use a process, which is to some extent quite the reverse to that, described afore in connection with Fig. 6. The audio frequency voltage could in this case be applied to the collector over the lead 55 and be picked up over the individual leads 61—65, by which means in analogy with the arrangement of Fig. 5 output pulses of the same frequency would be obtained on the separate output leads.

The circuit shown in Fig. 6 may still be used in another way, when the impedance 10, connecting the collector with its voltage supply, is high. Assuming the elements 11 and 14 being locked up, a connection will be established from the terminal 64 over the element 14 to the collector 3 and farther on to the element 11 and its terminal 61, as the resistance between the collector 3 and the locked-up elements is low, but the resistance between the collector and the other elements 12, 13 and 15 is high. Such a connection, established in this way between the elements 11 and 14 may be utilized, e. g., for the transmission of a telephone conversation.

Another method of reading the registered information is obtained, if one utilizes the potential difference between locked-up and locked-down elements, e. g. for continually opening electron tubes or for operating glow discharge triodes. Such an application is shown in Fig. 7 accomplished in the same manner as in the circuit in Fig. 5.

In the circuit according to Fig. 7, the potential of the different storage elements 11—13 is "recognized" by electron tubes, connected to each output lead 51—53. (Of these tubes only one, designated by 73, is shown in the figure). It shall be assumed, that the information registered in tube 45 is +, 0, +, i. e. the elements 11 and 13 have a high potential near the collector potential, and element 12 a low one, near cathode potential. For reading, no pulses are supplied to the tube 45, only the terminal 37 for the grid 2, the terminal 75 for the collector 3, and at the terminal 74, have a small positive potential (e. g. +10 volts), a high positive potential (e. g. +150 volts) and a small negative potential (e. g. −12 volts) respectively. Between each element 11—13 and its output lead 51—53 is a resistor 70—72 inserted, and in series with this resistor is each element 11—13 connected to a common terminal 74 over its individual resistors 67—69. In other words, a voltage divider is coupled into the output lead of each element, the one end of which is connected to the element and therefore gets the potential of the element (i. e. zero potential or a high positive potential), the other end being connected to the terminal 74, and thus receiving a small negative potential. In the present case, the value of the resistors 67—69 is chosen in such a manner, that the point between these resistors, connected to the output leads 51—53, receives a small positive voltage, when the corresponding element has a positive potential and a small negative voltage, when the element has a negative potential. Each output lead 51—53 is connected to the grid of its electron tube 73, therefore the bias voltage on the leads 51—53 from positive elements 11—13 being positive and from negative elements being negative. The negative voltages on the leads 51—53 are chosen in such a manner that the tube 73 for such a value is cut off and no anode current can flow.

The tube or the simple amplifier 73 has in its grid lead two input terminals 76, 77, to which a pulse train or a continual voltage is fed. If the tube is cut off, no outgoing pulse train or no outgoing current is obtained at the output terminals 78, 79 in the anode lead. If the tube, however, is conducting, i. e. if the potential at the corresponding lead 51—53 is positive, pulses or a voltage will appear at the terminals 78, 79. Obviously, the voltage at the terminals 78, 79 of each to a lead 51, 52 or 53 connected tube 73 will represent the information stored in the corresponding tube.

Further on, each variation of the current or voltage at one of the electrodes of the tube according to the invention will cause a variation of the current to the locked-up elements but not to a correspondingly high degree influence the current to the locked-down elements. There are still many other possibilities to distinguish between locked-up and locked-down elements besides those pointed out in connection with Figs. 5–7. The arrangement shown in Fig. 5, which utilizes a variation of the collector voltage seems to be one of the most effective. However, the pulsing of the collector has one disadvantage, i. e. the capacitance between the collector 3 and the elements 11—14 (this capacitance can reach ca. 0,8 pf. per element) influences the pulses. Experience has however shown that, with pulse lengths over 0.5 microsecond this influence is of no importance. In the circuit shown in Fig. 6, the mentioned capacitance has also an influence. In the circuit according to Fig. 7, where no pulses are used, this capacitance has no influence.

For shorter pulses than mentioned above, pulsing of the cathode current or of the cathode voltage is to be preferred, if one cannot instead neutralize this capacitance.

A great number of modifications of the described circuits are obvious for the expert, and it is further possible to use the tube according to the invention for a number of coupling functions in various applications.

The tube itself may have any suitable number of storage elements instead of these shown in the example.

We claim:

1. An electron tube for storing information comprising in combination, an evacuated envelope, an electron emitting cathode, an accelerator grid surrounding the cathode and adapted to have a positive potential with reference to the cathode, a second grid surrounding the accelerator and adapted to have a higher positive potential with reference to the cathode than the first grid, a number of secondary electron emissive, elongated conducting electrodes, the greater dimension of these electrodes being preferably parallel to the axis of the cathode, the accelerator grid and the second grid, said secondary emissive electrodes being arranged outside of said grids in the space filled by the primary electrons from the cathode and being simultaneously, equally and continuously exposed to bombardment by these primary electrons, an individual led through the envelope for each secondary emissive electrode, a screen surrounding and preferably uniformly spaced from said electrodes, means connecting this screen and the second grid together for the purpose of collecting a portion of the primary electrons and the secondary electron current released by these electrons from each of said secondary electron emissive electrodes.

2. An electron tube for storing information comprising in combination, an evacuated envelope, an electron emitting cathode, an accelerator grid surrounding the cathode and adapted to have a positive potential with reference to the cathode, a second grid surrounding the accelerator grid and adapted to have a higher positive potential with reference to the cathode than the first grid, a plurality of secondary electron emissive, elongated conducting electrodes, the greater dimension of these electrodes being preferably parallel to the axes of the cathode, the accelerator grid and the second grid, said electrodes being arranged outside of said grids in the space filled by the primary electrons and being simultaneously, equally and continuously exposed to bombardment by the primary electrons, said secondary emissive electrodes being separately and individually electrically accessible over individual leads through the vacuum envelope, a screen surrounding said electrodes collectively, electrically connected to the second grid and with it having a compartment for and enclosing each electrode on three sides, leaving the side facing the cathode free, said screen-second grid assembly serving the purpose of collecting a portion of the primary electrons and the secondary electron current from said secondary electron emissive electrodes and screening these electrodes electrostatically from each other.

3. An electron tube for storing information comprising in combination, an evacuated envelope, an electron emitting cathode, a negatively biased grid for controlling the electron emission from the cathode, an accelerator grid having a positive potential with reference to the cathode and surrounding the control grid and the cathode, a plurality of secondary electron emissive, elongated conducting electrodes, the greater dimension of these electrodes being preferably parallel to the axis of the cathode, said electrodes being arranged outside of said grids in the space filled by the primary electrons and being simultaneously, equally and continuously exposed to bombardment by the primary electrons, an individual lead through the envelope for each secondary emissive electrode, a highly positively charged screen preferably uniformly spaced from said electrodes, means forming compartments on said screen one for each of said electrodes, enclosing these electrodes on the three sides only which do not face the cathode, said screen serving the purpose of collecting a portion of the primary electrons and also the secondary electron current from said secondary emissive electrodes and screening these electrodes electrostatically from each other.

4. The electron tube according to claim 1 in which the accelerator grid is divided into parts and the secondary emissive electrodes are arranged in two separate groups, the relative dispositions of these elements being such that each of the accelerator grid parts is assigned to one group of secondary emissive electrodes.

5. The electron tube according to claim 4 in which the screen and second grid assemblies are likewise divided into parts, one allotted to each accelerator grid-secondary emissive electrode group.

References Cited in the file of this patent

UNITED STATES PATENTS

| | | |
|---|---|---|
| 2,157,529 | Drewell et al. | May 9, 1939 |
| 2,217,774 | Skellett | Oct. 15, 1940 |
| 2,424,289 | Snyder et al. | July 22, 1947 |
| 2,494,670 | Rajchman | Jan. 17, 1950 |
| 2,513,743 | Rajchman | July 4, 1950 |
| 2,638,541 | Wallmark | May 12, 1953 |